United States Patent Office 2,935,335
Patented May 3, 1960

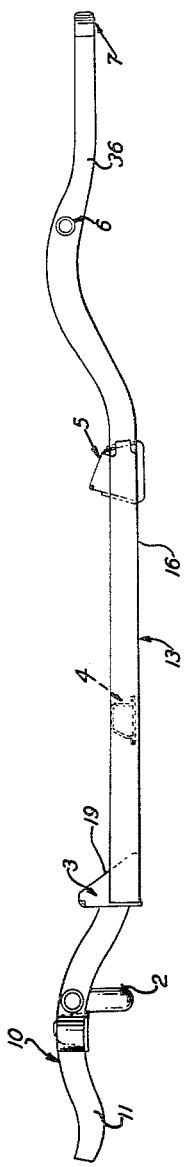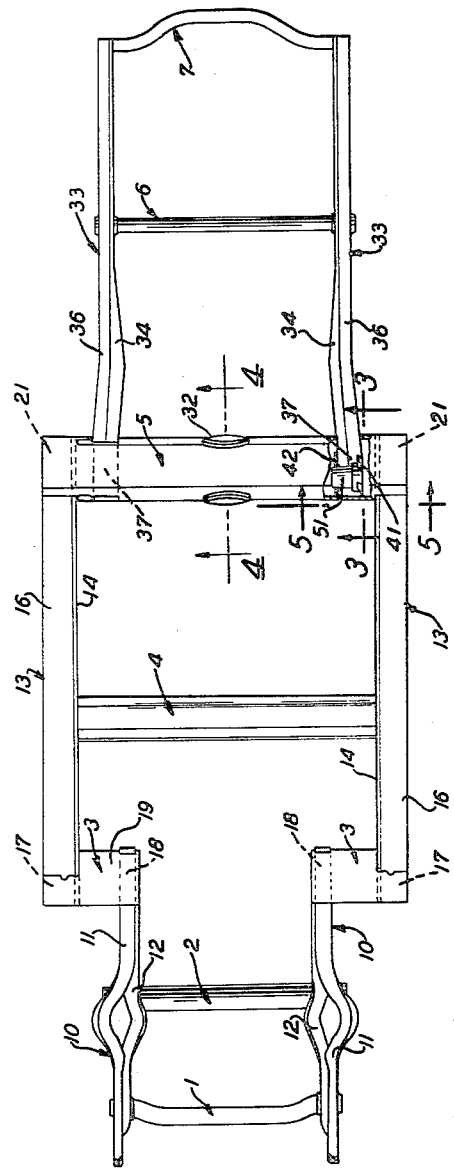

2,935,335

VEHICLE FRAME CONSTRUCTION

George H. Muller, Northville, and William E. Rudnicki, Detroit, Mich., assignors to Ford Motor Company, Dearborn, Mich., a corporation of Delaware Application July 7, 1958, Serial No. 746,958

8 Claims. (Cl. 280—106)

This invention relates generally to a frame construction for motor vehicles and is applicable both to vehicle constructions of the separate frame type and also those of the unit body and frame type.

An object of the present invention is to provide a vehicle frame construction having favorable weight and cost characteristics and providing the desired support and clearance for various vehicle components as well as occupants of the vehicle while at the same time possessing the requisite frame rigidity. This is accomplished in an embodiment of the invention by providing front, center and rear pairs of side frame rails with the front and rear rails offset inwardly from the center rails and interconnected by cross frame members of enclosed section and of relatively large cross sectional area to provide torsional stiffness for the frame. The cross frame members incorporate structure providing reinforcement and augmenting the strength of the assembly.

Other objects and advantages of this invention will be made more apparent as this description proceeds, particularly in connection with the accompanying drawings, in which:

Figure 1 is a side elevational view of a frame incorporating the present invention;

Figure 2 is a plan view thereof;

Figure 3:
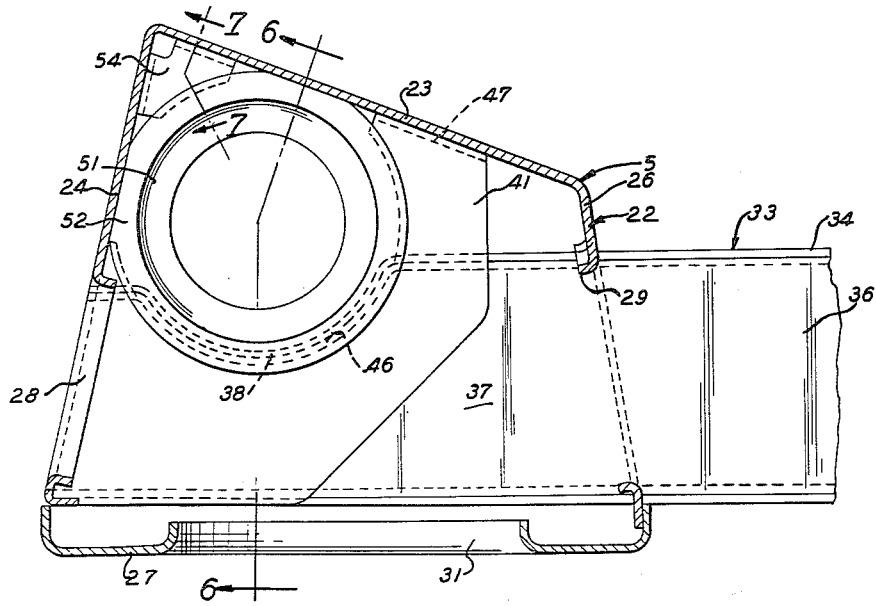
Figure 4:
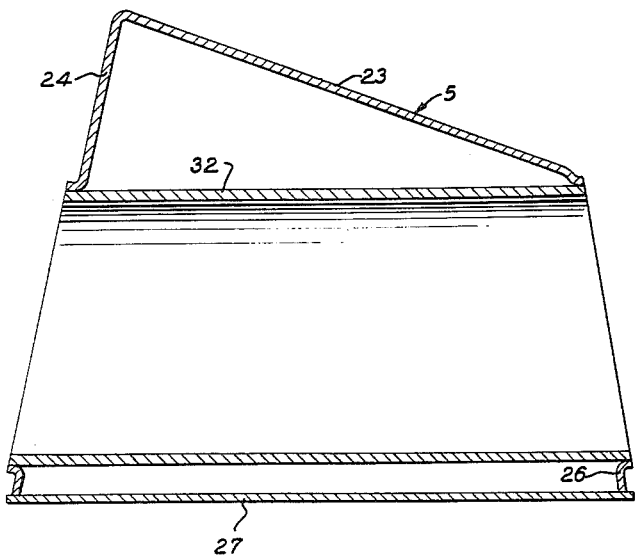
Figure 5:
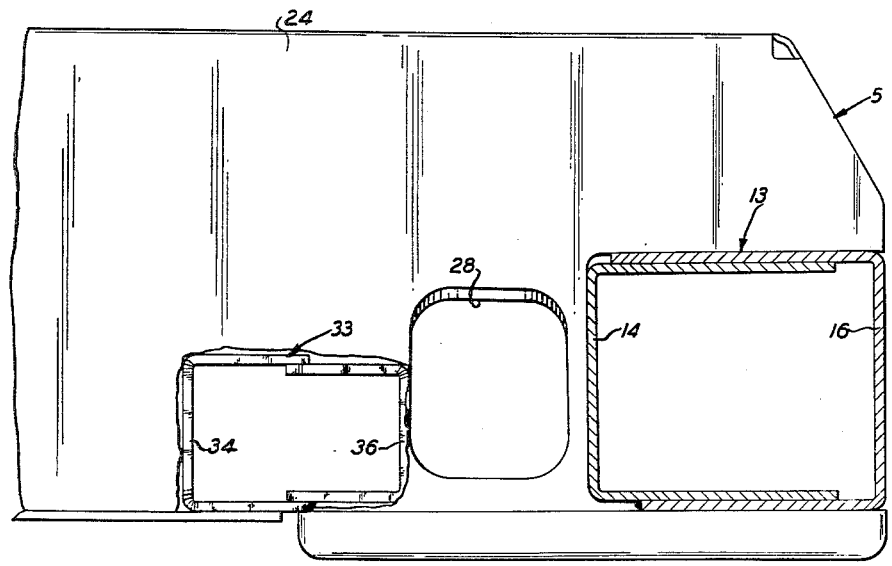
Figure 6:
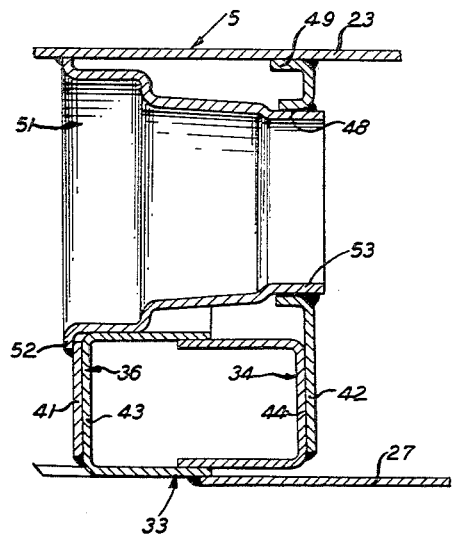
Figure 7:
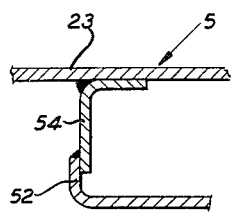

Figures 3, 4 and 5 are enlarged cross sectional views taken on the planes indicated by the lines 3—3, 4—4 and 5—5 of Figure 2;

Figures 6 and 7 are cross sectional views taken on the planes indicated by the lines 6—6 and 7—7 of Figure 3.

Referring now to the drawings, and particularly to Figures 1 and 2, the reference character 10 indicates generally the front pair of side frame rails. The front side frame rails 10 are each formed of a pair of U-shaped channels 11 and 12 facing each other and welded together to form an enclosed box section rail. The front side frame rails 10 are interconnected by #1 and #2 cross members with #2 cross member being of tubular construction and bowed downwardly to provide clearance for the vehicle engine.

The center side frame rails 13 are parallel to each other and are spaced laterally a greater distance than the front side frame rails 10. The center frame rails 13 are also of enclosed box section, each being formed of a pair of U-shaped channels 14 and 16 facing each other and welded together.

The forward ends 17 of the center frame rails 13 overlap the rearward ends 18 of the front frame rails 10, and the overlapping ends project longitudinally into respective openings formed in a pair of relatively short laterally extending #3 cross members. As seen in Figure 1, the #3 cross members are generally triangular in cross sectional shape and have a cross sectional area considerably larger than the cross sectional area of either the front or center frame rails. The #3 cross members also have a vertical dimension considerably greater than that of the frame rails to provide torsional rigidity, and the rear wall 19 of these cross members is inclined upwardly and forwardly to conform generally with the toe board of the front passenger compartment of the vehicle. Being spaced laterally apart, the short #3 cross members provide clearance for the power plant and transmission of the vehicle.

Intermediate their ends the center frame rails 13 are interconnected by a #4 cross member which may be bowed downwardly adjacent its center portion to provide clearance for the drive line. The #4 cross member may also support the rear engine mount.

The rearward end portions 21 of the center frame rails 13 project into openings formed at the laterally outer ends of the #5 cross member, and are rigidly welded thereto. The #5 cross member is of enclosed generally box section construction and has a cross sectional area considerably larger than that of the side rails and also a greater vertical dimension. As shown, the #5 cross member in cross section forms a trapezium but it may, if desired, have other cross sectional shapes.

As best seen in Figures 1 and 3, the #5 cross member is formed of an upper inverted channel 22 having an upper wall 23, a front wall 24 and a rear wall 26. The lower open side of the channel 22 is closed by a plate 27 forming the lower wall of the #5 cross member. It will be noted that the lower wall 27 is horizontal, that the front and rear walls 24 and 26 incline inwardly toward each other, and that the upper wall 23 inclines downwardly in a rearward direction. As shown in Figure 3, access openings 28, 29 and 31 are formed in the front, rear and lower walls 24, 26 and 27 respectively of the #5 cross member to assist in the fabrication of the frame.

The #5 cross member is located beneath the rear seat of the vehicle to provide clearance for its relative large size without interfering with other vehicle components. Adjacent the center line of the vehicle a tube 32 extends through the front and rear walls of the #5 cross member reinforcing the latter and providing clearance for the vehicle propeller shaft to extend therethrough.

A pair of rear side frame rails 33 are provided and are offset laterally inwardly from the center frame rails 13. The rear frame rails 33 are of enclosed box section being formed of a pair of channels 34 and 36 facing each other and welded together. Adjacent the center and rear of the rear frame rails 33, the latter are interconnected by #6 and #7 cross members.

The forward ends 37 of the rear frame rails 33 project through rectangular openings in the rear wall 26 of the #5 cross member and overlap the rearward ends 21 of the center frame rails 13. With reference to Figure 3, it will be noted that the upper walls of the rear frame rails 33 are bowed downwardly at 38 within the #5 cross member, for a purpose to be described more in detail hereinafter. The rear frame rails 33 are welded both to the front and rear walls 24 and 26 of the #5 cross member, and additional structure is provided to rigidly connect the #5 cross member and the rear frame rails 33 to provide a frame having the requisite torsional rigidity.

This reinforcing structure includes a pair of vertically extending plates 41 and 42 welded to the bases 43 and 44 of the opposed channel members 36 and 34 forming the rear side frame rails 33. As best shown in Figure 3, the outboard reinforcing plate 41 is formed with an arcuate notch 46 on its upper surface and with an upper flange 47 welded to the upper wall 23 of the #5 cross member. The inboard reinforcing plate 42 is formed with a circular opening 48 therethrough and with an upper flange 49 welded to the upper wall 23 of the #5 cross member.

The laterally spaced reinforcing plates 41 and 42 are interconnected above the downwardly bowed portion 38 of each rear frame rail 33 by means of a stepped reinforcing tube 51. At its outboard end each tube 51 has a marginal flange 52 welded to the outboard reinforcing plate 41 and also welded to the upper and front walls 23 and 24 of the #5 cross member. The reduced inboard end 53 of the reinforcing tube 51 projects through the flanged opening 48 in the inboard reinforcing plate 42 and is welded thereto. Additional support for the marginal flange 52 at the outboard end of the reinforcing tube 51 is provided by means of a reinforcing bracket 54 located in the upper corner of the #5 cross member and suitably welded to the cross member and the tube flange.

During the assembly of the above described parts of the vehicle frame, access to the interior of the #5 cross member for assembly and welding purposes may be had through the access openings 28, 29 and 31.

The above described frame construction is economical to build and is relatively light in construction, yet it possesses the required strength and torsional rigidity for modern vehicle construction. It also provides clearance for vehicle components such as the engine transmission and driveline, and likewise provides foot room for the front and rear passengers of the vehicle. Although shown in connection with a separate frame type of construction, the structure of the invention may be likewise applied to a vehicle construction of the unit frame and body type.

It will be understood that the invention is not to be limited to the exact construction shown and described, but that various changes and modifications may be made without departing from the spirit and scope of the invention, as defined in the appended claims.

What is claimed is:

1. In a frame for a motor vehicle, a pair of laterally spaced generally parallel side frame rails, a laterally extending cross frame member at the rearward ends of said side frame rails extending laterally completely across said frame, said cross frame member being of enclosed construction and having a cross sectional area at all parts of its lateral extent considerably larger than the cross sectional area of said side frame rails, said cross frame member having longitudinally extending openings at each end to receive the rearward ends of said side frame rails, means rigidly connecting said side frame rails thereto, a pair of generally parallel rear side frame rails spaced laterally inwardly from said first mentioned side frame rails and projecting longitudinally forwardly through openings in said cross frame member, and means rigidly connecting said rear side frame rails to said cross frame member.

2. In a frame for a motor vehicle, a pair of laterally spaced generally parallel side frame rails, a laterally extending cross frame member at the rearward ends of said side frame rails, said cross frame member being of generally box section enclosed construction and having a relatively large cross sectional area, said cross frame member being rigidly connected at its laterally outer ends to the rearward ends of said side frame rails, a pair of generally parallel rear side frame rails spaced laterally inwardly from said first mentioned side frame rails and having their forward ends projecting longitudinally forwardly through openings in said cross frame member, said rear frame rails being of enclosed box section construction and having a vertical dimension considerably smaller than the maximum vertical dimension of said cross frame member to provide a space between the upper walls of the forward ends of said rear frame rails and the upper wall of said cross frame member, two pair of generally vertically extending reinforcing plates within said cross frame member and secured to the opposite sides of the forward ends of said rear frame rails and also secured to the upper wall of said cross frame member, and a generally tubular reinforcing member located within said cross frame member vertically above the forward end of each of said rear frame rails, said tubular reinforcing members projecting through openings in said reinforcing plates and secured thereto to provide a torsionally rigid vehicle frame construction.

3. A frame for a motor vehicle comprising front, center and rear pairs of generally parallel side frame rails, said front frame rails being offset laterally inwardly from said center frame rails and overlapping the forward ends of said center frame rails, a pair of laterally spaced laterally extending short cross members each interconnecting the rearward end of one of said front frame rails with the forward end of the adjacent center frame rail, said rear frame rails being offset laterally inwardly from said center frame rails and overlapping the rearward ends of said center frame rails, and an enclosed generally box section laterally extending cross member interconnecting the rearward ends of said center frame rails and the forward ends of said rear frame rails, said box section cross member forming a trapezium in cross section with a generally horizontal base, front and rear walls inclined inwardly toward each other and an interconnecting upper wall sloping downwardly in a rearward direction.

4. In a frame for a motor vehicle, a pair of laterally spaced generally parallel side frame rails, a laterally extending cross frame member at the rearward ends of said side frame rails, said cross frame member being of enclosed construction and having a cross sectional area considerably larger than the cross sectional area of said side frame rails, said cross frame member having longitudinally extending openings at each end to receive the rearward ends of said side frame rails, means rigidly connecting said side frame rails thereto, a pair of generally parallel rear side frame rails spaced laterally inwardly from said first mentioned side frame rails and projecting longitudinally forwardly through openings in said cross frame member, means rigidly connecting said rear side frame rails to said cross frame member, said cross frame member extending vertically a considerable distance above said rear side frame rails to provide a space between the top of the projecting front end portions of said rear side frame rails and the upper wall of said cross frame member, and a laterally extending reinforcing member within said cross frame member above said end portions of said rear side frame rails and rigidly secured to said end portions and to said cross frame member.

5. The structure defined by claim 4 which is further characterized in that said reinforcing member extends laterally and is of hollow enclosed construction in cross section, and a pair of generally vertical plates secured to opposite sides of said end portions of said rear side frame rails, to said reinforcing member and to the upper wall of said cross frame member.

6. A frame for a motor vehicle comprising front, center and rear pairs of generally parallel side frame rails, said front frame rails being offset laterally inwardly from said center frame rails and overlapping the forward ends of said center frame rails, a pair of laterally spaced laterally extending short cross members each interconnecting the rearward end of one of said front frame rails with the forward end of the adjacent center frame rail, said short cross members being of generally triangular cross section with the upper portion thereof projecting above the adjoining upper portions of said front and center frame rails, said front and center frame rails projecting into said short triangular cross member and rigidly secured thereto, said rear frame rails being offset laterally inwardly from said center frame rails and overlapping the rearward ends of said center frame rails, and an enclosed generally box section laterally extending cross member interconnecting the rearward ends of said center frame rails and the forward ends of said rear frame rails.

7. The structure defined by claim 6 which is further characterized in that the rear walls of said short triangular cross members are inclined upwardly and forwardly to provide foot clearance for occupants of said vehicle.

8. In a frame for a motor vehicle, a pair of laterally spaced generally parallel side frame rails, a cross frame member at the rearward ends of said side frame rails extending laterally completely across said frame, said cross frame member having longitudinally extending openings at each end to receive the rearward ends of said side frame rails, means rigidly connecting said side frame rails thereto, a pair of generally parallel rear side frame rails spaced laterally inwardly from said first-mentioned side frame rails and projecting forwardly through openings in said cross frame member, means rigidly connecting said rear side frame rails to said cross frame member, said cross frame member having vertical and horizontal overall dimensions at all parts of its lateral extent considerably larger than the vertical and horizontal dimensions of said side frame rails and said rear side frame rails to form an interconnecting frame member having high torsional rigidity.

References Cited in the file of this patent

UNITED STATES PATENTS 2,127,553    Dietrich ---------------- Aug. 23, 1938

FOREIGN PATENTS 376,384    Great Britain ----------- July 14, 1932

OTHER REFERENCES

SAE Journal, April 1956, page 30.